United States Patent
Hamdi et al.

(10) Patent No.: US 9,678,563 B2
(45) Date of Patent: *Jun. 13, 2017

(54) DYNAMIC POWER SUPPLY SYSTEM

(71) Applicant: Dell Products L.P., Round Rock, TX (US)

(72) Inventors: Rabah S. Hamdi, Spring, TX (US); Bradley J. Booth, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,930

(22) Filed: Aug. 30, 2016

(65) Prior Publication Data

US 2016/0370850 A1 Dec. 22, 2016

Related U.S. Application Data

(63) Continuation of application No. 14/844,982, filed on Sep. 3, 2015, now Pat. No. 9,465,425, which is a continuation of application No. 13/738,364, filed on Jan. 10, 2013, now Pat. No. 9,146,613.

(51) Int. Cl.
*G06F 1/32* (2006.01)
*G06F 1/26* (2006.01)

(52) U.S. Cl.
CPC ........... *G06F 1/3287* (2013.01); *G06F 1/266* (2013.01); *G06F 1/325* (2013.01); *G06F 1/3215* (2013.01); *G06F 1/3296* (2013.01); *Y02B 60/1285* (2013.01); *Y02B 60/43* (2013.01); *Y02B 60/44* (2013.01)

(58) Field of Classification Search
CPC .......... G06F 1/26; G06F 1/266; G06F 1/3215; G06F 1/325
USPC ........................................ 713/300, 330, 340
See application file for complete search history.

(56) References Cited

U.S. PATENT DOCUMENTS

| | | | |
|---|---|---|---|
| 7,155,622 B2 | 12/2006 | Mancey et al. | |
| 7,340,620 B2 | 3/2008 | Dove | |
| 7,698,580 B2 | 4/2010 | Schindler et al. | |
| 7,849,333 B2 | 12/2010 | Schindler | |
| 7,966,502 B2 * | 6/2011 | Diab ........................ | G06F 1/26 713/300 |
| 8,001,397 B2 | 8/2011 | Hansalia | |
| 8,132,029 B2 | 3/2012 | Alms et al. | |
| 8,205,102 B2 | 6/2012 | Kabbara et al. | |
| 8,225,124 B2 | 7/2012 | Geiger et al. | |
| 8,375,232 B2 | 2/2013 | Khan et al. | |

(Continued)

*Primary Examiner* — Chun Cao
(74) *Attorney, Agent, or Firm* — Haynes and Boone, LLP

(57) ABSTRACT

A power sourcing equipment (PSE) device including a power over Ethernet (PoE) interface. A processor is coupled to the PoE interface. A memory is coupled to the processor and includes instruction that, when executed by the processor, cause the processor to perform a number of functions. The processor may supply power at a first power level to a PD that is coupled to the PoE interface. The processor may then determine an actual power consumption of the PD. The processor may then send a first Link Layer Discovery Protocol (LLDP) packet to the PD over the PoE interface that includes first proposed power level information that is based on the actual power consumption of the PD. Then processor may then supply power to the PD at a second power level that is different from the first power level.

17 Claims, 9 Drawing Sheets

(56) References Cited

U.S. PATENT DOCUMENTS

| | | |
|---|---|---|
| 8,935,542 B2 | 1/2015 | Diab et al. |
| 9,088,434 B2 | 7/2015 | Diab et al. |
| 9,146,613 B2 | 9/2015 | Hamdi et al. |
| 9,465,425 B2 * | 10/2016 | Hamdi .................... G06F 1/266 |
| 2010/0031066 A1 | 2/2010 | Geiger et al. |
| 2010/0205466 A1 | 8/2010 | Diab et al. |
| 2011/0217873 A1 | 9/2011 | Diab et al. |
| 2013/0308941 A1 | 11/2013 | Diab |
| 2015/0378410 A1 | 12/2015 | Hamdi et al. |

* cited by examiner

| Field Name | Values | Description |
|---|---|---|
| Type | 127 | Organizationally specific TLV |
| Length | 9 | Length of TLV value |
| TIA OUI | TBD | Organizationally unique identifier |
| Power Control Subtype | TBD | Subtype |
| Sender | PSE = 0<br>PD = 1 | TLV originator |
| Power Control Event | 0 = No event<br>1 = Proposed Max Power Level<br>2 = Normal power state<br>3 = Standby power state<br>4 = Sleep power state<br>5 = Remove power<br>6-15 = TBD | Event or control message |
| Power priority | 0 = Low<br>1 = High<br>2 = Mandatory | Power priority and importance level |
| Maximum power value | 0-120 Watts | Maximum allowed power value based on classification, or maximum power value the PD device requires and shall be less than the classifications |
| Proposed power value | 0-120 Watts | Power value conveyed, in 0.1W resolution |

FIG. 5B

DYNAMIC POWER SUPPLY SYSTEM

CROSS-REFERENCE TO RELATED APPLICATIONS

This application is a Continuation of U.S. patent application Ser. No. 14/844,982, filed on Sep. 3, 2015, "POWER OVER ETHERNET (POE) DYNAMIC POWER SUPPLY SYSTEM", which in turn is a Continuation of U.S. patent application Ser. No. 13/738,364 filed on Jan. 10, 2013, entitled "ADVANCED PoE POWER CONTROL," now U.S. Pat. No. 9,146,613, issued on Sep. 29, 2015, the disclosures of which is incorporated herein by reference.

BACKGROUND

The present disclosure relates generally to information handling systems, and more particularly to powering information handling systems using advanced Power over Ethernet (PoE) power control.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs using Power over Ethernet (PoE) technology to send power and data to other IHSs and/or receive power and data from other IHSs. PoE technology provides for the transmission of power safely, along with the data, over Ethernet cabling. The original Institute of Electrical and Electronics Engineers (IEEE) 802.3af standards provide up to 15.4 watts (W) of DC power (minimum 44 volts (V) direct current (DC) and 350 milliamps (mA)), while the updated IEEE 802.3at standards (also known as PoE+) provides up to 25.5 W. The IEEE 802.3af and IEEE 802.3at standards provide for the classification of powered devices (PDs) based on a predefined control protocol or hardware classification, and the power sourcing equipment (PSE) device statically assigns the power level of the power that will be provided to the PD based on the amount designated in the standards for the PD's classification. There are currently 5 classifications: Class 0, the default classification, provides for devices that draw a current of 0-4 mA and a power range of 0.44-12.94 W. Class 1 provides for devices that draw a current of 9-12 mA and a power range of 0.44-3.84 W. Class 2 provides for devices that draw a current of 17-20 mA and a power range of 3.84-6.49 W. Class 3 provides for devices that draw a current of 26-30 mA and a power range of 6.49-12.95 W. Class 4, used by 802.3at devices, provides for devices that draw a current of 36-44 mA and a power range of 12.95-25.5 W.

The static assignment by the PSE device of the power level that will be provided to a PD based on the classification discussed above raises a number of issues. Such static assignments result in the PSE device statically allocating the maximum amount of power needed by a PD of that class when operating (e.g., a PD classified as a class 3 device results in the PSE statically allocating 12.95 W to that PD even if that PD actually draws a maximum of only 8 W power.) Thus, current PoE power systems are inefficient in their allocation of power due to their static assignment of power to PDs based on a classification that can result in the PSE assigning more power to a PD than is necessary Accordingly, it would be desirable to provide an improved PoE power control system.

SUMMARY

According to one embodiment, a power sourcing equipment (PSE) device includes a power over Ethernet (PoE) interface; a processor coupled to the PoE interface; a memory coupled to the processor and including instruction that, when executed by the processor, cause the processor to: supply power at a first power level to a PD that is coupled to the PoE interface; determine an actual power consumption of the PD; send a first Link Layer Discovery Protocol (LLDP) packet to the PD over the PoE interface that includes first proposed power level information that is based on the actual power consumption of the PD; and supply power to the PD at a second power level that is different from the first power level.

BRIEF DESCRIPTION OF THE DRAWINGS

FIG. 5B is a chart illustrating an embodiment of examples of values for the LLDP MED PoE power control TLV of FIG. 5A.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
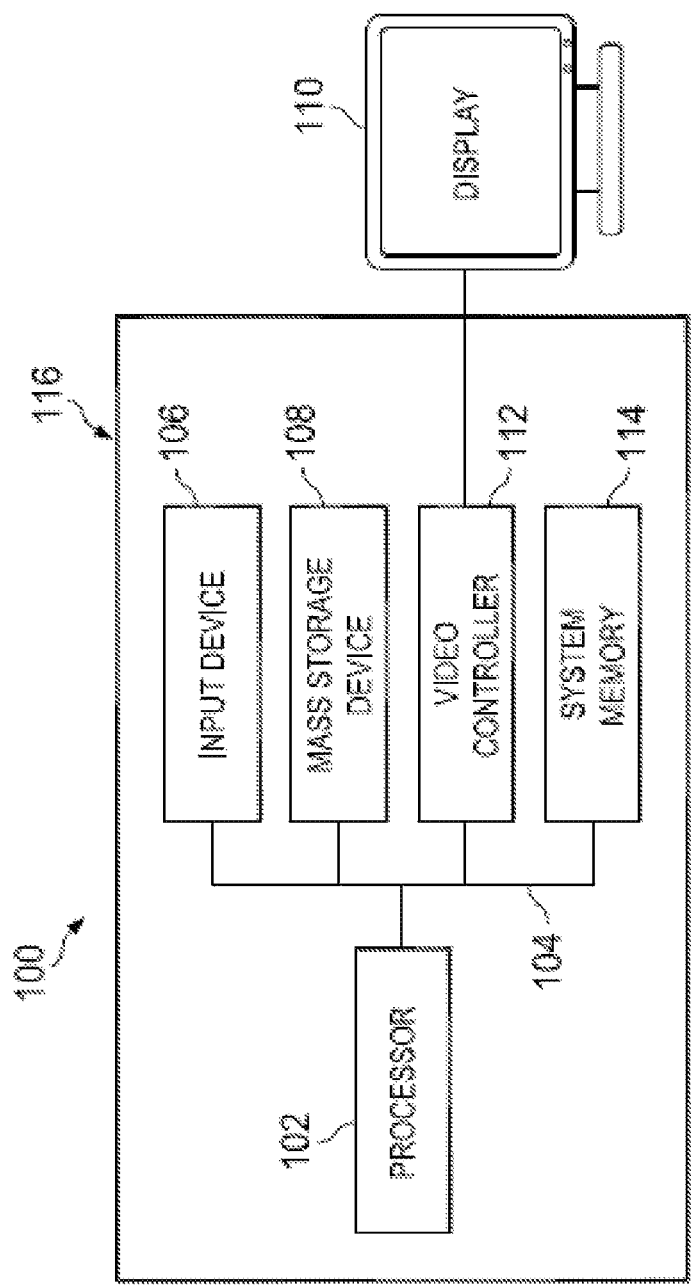
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
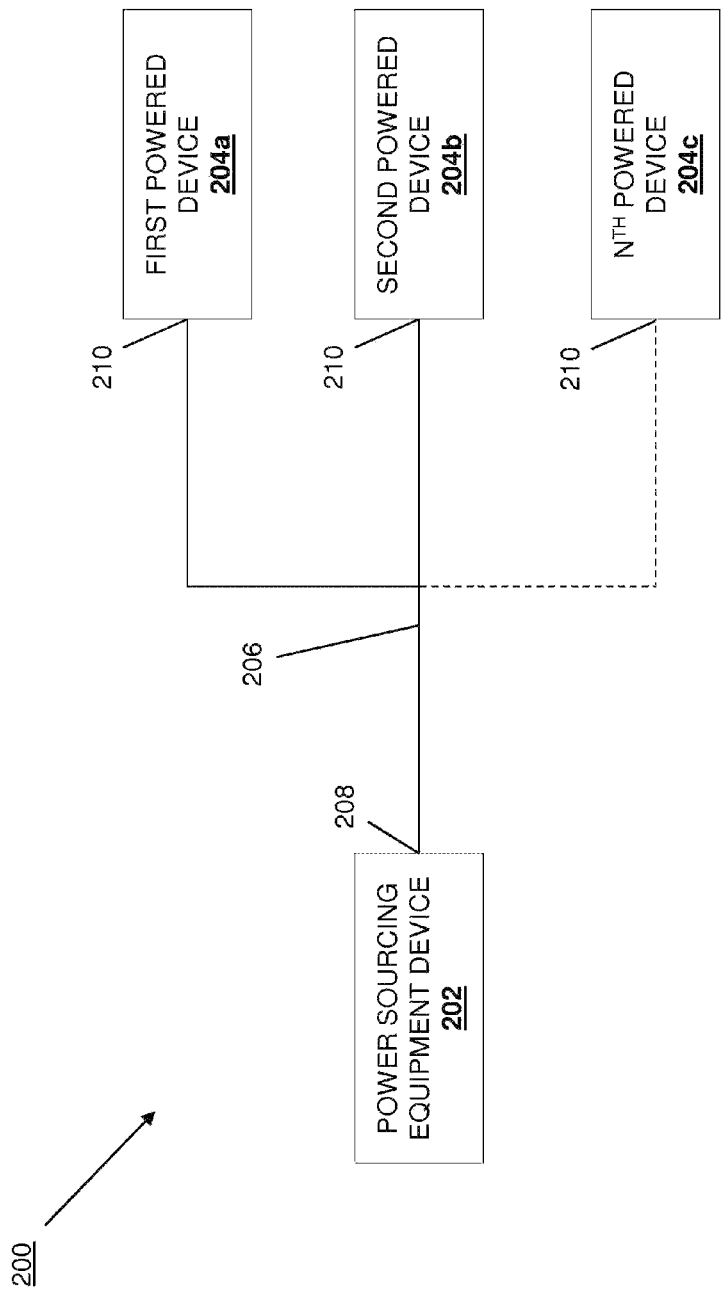
FIG. 2 is a schematic view illustrating an embodiment of a power over Ethernet (PoE) system.

Referring now to FIG. 2, an embodiment of a power over Ethernet (PoE) system 200 is illustrated. The PoE system 200 includes a power sourcing equipment (PSE) device 202 coupled to a plurality of powered devices (PDs), such as the first PD 204a, the second PD 204b, and up to the $N^{TH}$ PD 204c of the illustrated embodiment. In an embodiment, any of the PSE device 202, the first PD 204a, the second PD 204b, and up to the $N^{TH}$ PD 204c may be the IHS 100 and/or include some or all of the IHS components of the IHS 100, discussed above with reference to FIG. 1. For example, the PSE device 202 may be a switch, a bridge, and/or a variety of other network IHSs known in the art. In another example, the PDs 204a, 204b, and 204c may be network access points (e.g., wireless access points), IP telephony devices, monitoring devices (e.g., camera systems), point of sale devices, and/or a variety of other PDs known in the art. As discussed in more detail below, the PSE device 202 may include a processor and a memory that includes instructions that, when executed by the processor, cause the processor to provide power and data to the PDs 204a, 204b, and 204c, determine the actual power consumption of the PDs 204a, 204b, and 204c, communicate with the PDs 204a, 204b, and 204c, and provide any of the other PSE device functions discussed below. As also discussed below, any of the PDs 204a, 204b, and/or 204c may include a processor and a memory that includes instructions that, when executed by the processor, cause the processor to determine the power requirements of the PD, communicate with the PSE device 202, and provide any of the other PD functions discussed below.

The PSE device 202 may be coupled to each of the first PD 204a, the second PD 204b, and the $N^{TH}$ PD 204c through one or more Ethernet cables 206 that couple to the PSE device 202 through one or more PoE interfaces 208 and that couple to the PDs 204a, 204b, and 204c through PoE interfaces 210. While not illustrated, one of skill in the art will recognize that the PSE device 202 may be coupled to a network (e.g., the Internet), a data source (e.g., a server), as well as a power source (e.g., an Alternating Current (AC) power source), and thus may include components for providing data from the network or data source and providing power from the power source safely via the PoE interface 208 and through the Ethernet cable(s) 206, as discussed in further detail below. Similarly, while not illustrated, one of skill in the art will recognize that the PDs 204a, 204b, and 204c may include components for extracting data and power sent over the Ethernet cable(s) 206 from the PSE device 202 and received through the PoE interfaces 210, as discussed in further detail below.

Figure 3:
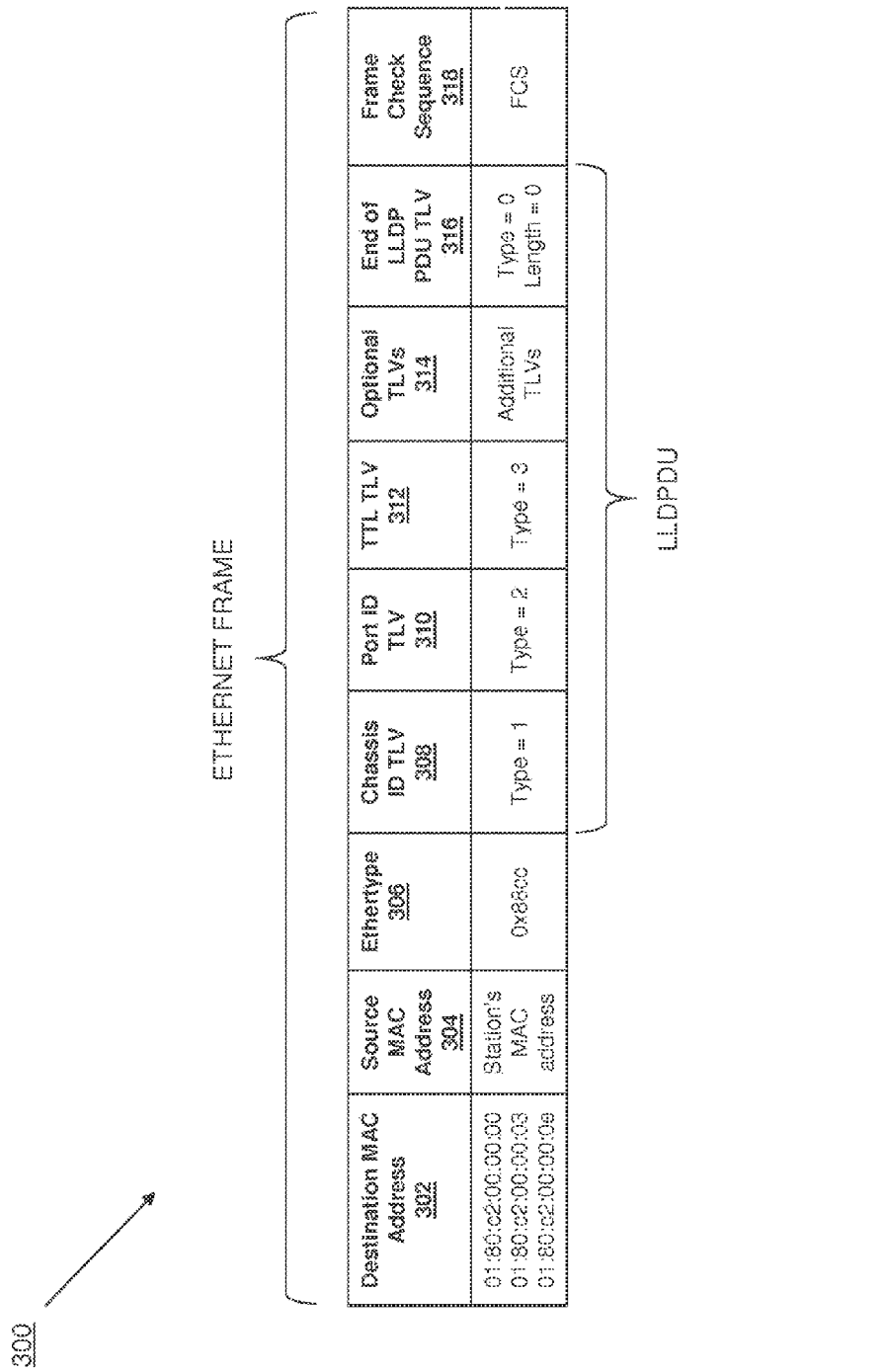
FIG. 3 is a chart illustrating an embodiment of an Ethernet frame.

Referring now to FIG. 3, an embodiment of an Ethernet frame 300 is illustrated that includes a Link Layer Discovery Protocol (LLDP) Data Unit (LLDPDU). The Ethernet frame 300 includes a Destination Media Access Control (MAC) Address 302 that may include a special multicast address (e.g., "01:80:c2:00:00:00", "01:80:c2:00:00:03", "01:80:c2:00:00:0e" in the illustrated embodiment) that will prevent an 802.1D compliant bridge from forwarding the Ethernet frame 300. The Ethernet frame 300 also includes a Source MAC Address 304 that may include the MAC address of the device sending the Ethernet frame 300. The Ethernet frame 300 also includes an Ethertype 306 that may include the protocol of the payload of the Ethernet frame 300 (e.g., "0x88cc" in the illustrated embodiment.) The Ethernet frame 300 also includes a Chassis identification type-length-value (TLV) 308, a port identification TLV 310, a Time To Live (TTL) TLV 312, one or more Optional TLVs 314, and an End of LLDP PDU TLV 316, together which provide the LLDPDU. The Ethernet frame 300 also includes a frame check sequence 318 that may be used for error detection. As discussed below, the Optional TLVs 314 may be used by the PSE device 202 and the PDs 204a, 204b, and/or 204c to convey power requirements and dynamically control power.

Figure 4:
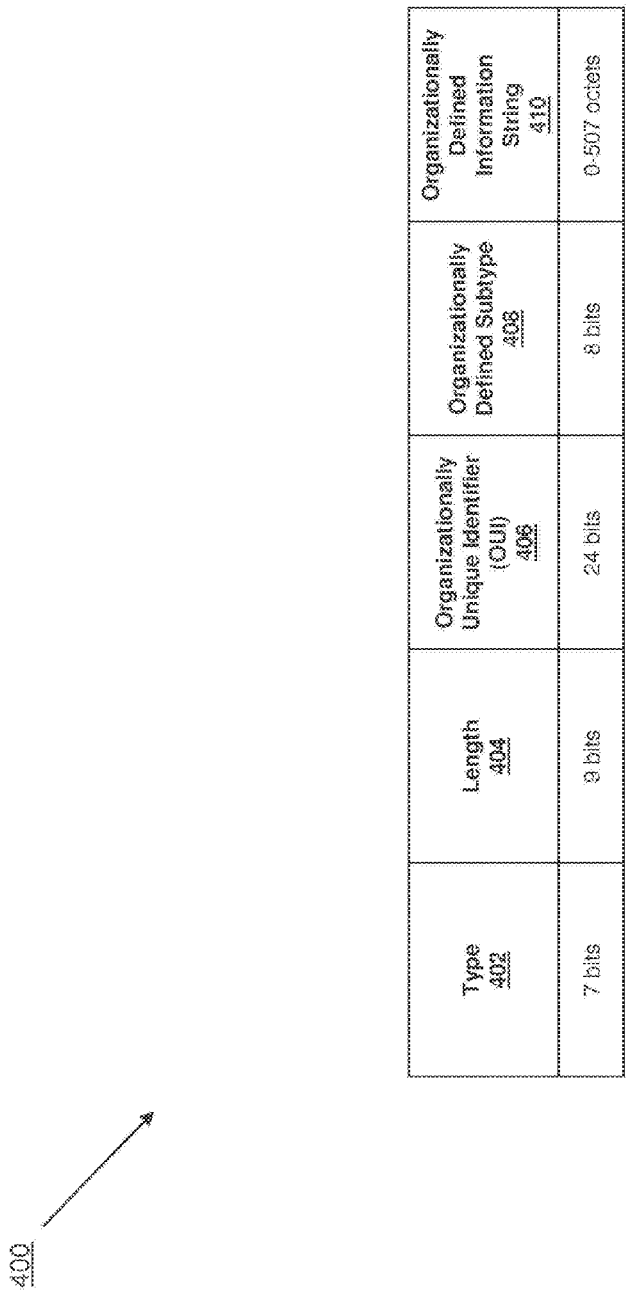
FIG. 4 is a chart illustrating an embodiment of an organizationally specific type-length-value (TLV) format.

Referring now to FIG. 4, an embodiment of an organizationally specific TLV 400 is illustrated that may be used to convey power requirements and dynamically control power. The organizationally specifically TLV 400 includes a type 402 provided by seven bits that identify the type of TLV (e.g., the Optional TLVs used in an embodiment of the present disclosure are type 127). The organizationally specifically TLV 400 includes a length 404 provided by nine bits that identify the length of the TLV. The organizationally specifically TLV 400 includes an Organizationally Unique Identifier 406 and an Organizationally Defined Subtype 408, which are provided by twenty-four bits and eight bits, respectively, and are discussed in further detail below with regard to their use in conveying power requirements and dynamically controlling power. The organizationally specifically TLV 400 includes a Organizationally Defined Information String 410 that may be provided by 0-507 octets and are discussed in further detail below with regard to their use in conveying power requirements and dynamically controlling power.

Figure 5A:
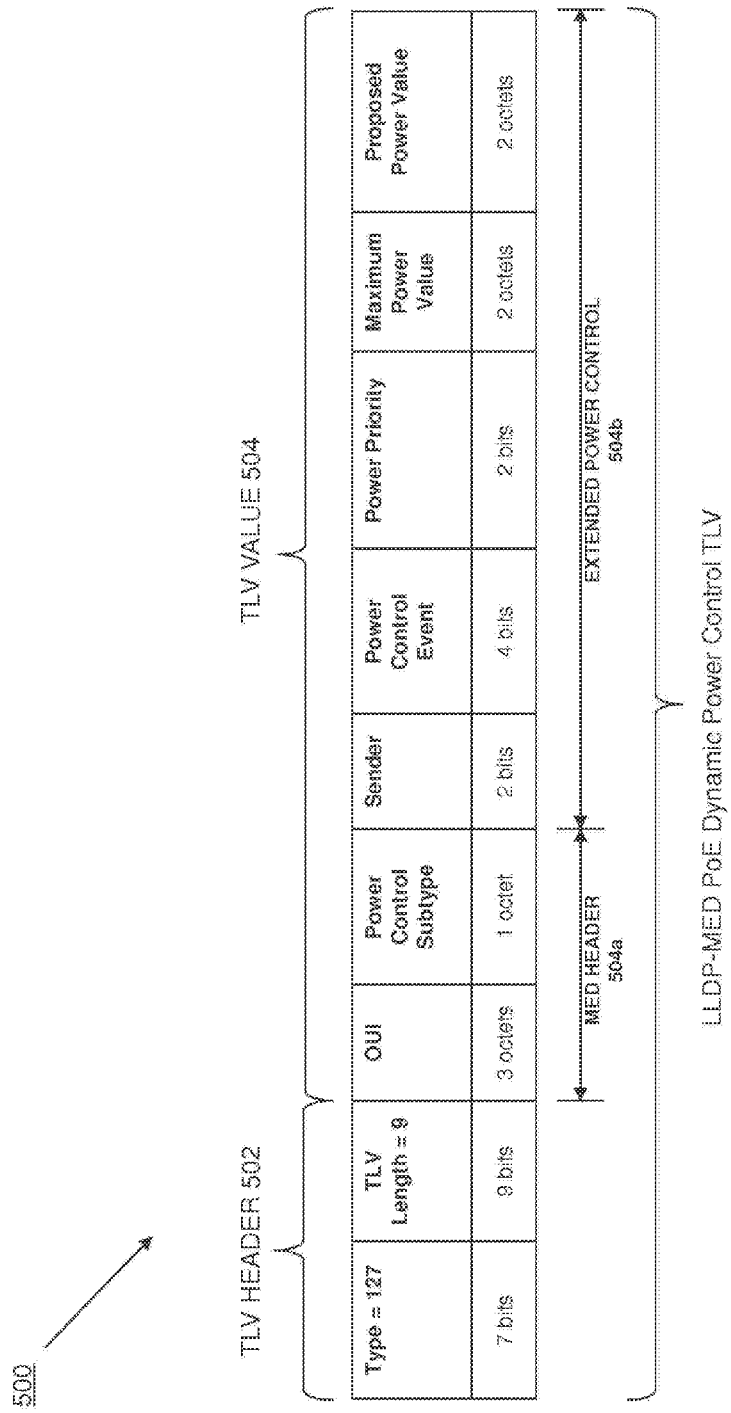
FIG. 5A is a chart illustrating an embodiment of a link layer discovery protocol (LLDP) media endpoint discovery (MED) PoE power control TLV.

Referring now to FIGS. 5A and 5B, an embodiment of an LLDP-MED (Media Endpoint Discovery) PoE Dynamic Power Control TLV 500 is illustrated. The LLDP-MED PoE Dynamic Power Control TLV 500 includes a TLV header 502 including the Type (e.g., "127") and Length (e.g., "9")

of the TLV. The LLDP-MED PoE Dynamic Power Control TLV 500 includes a TLV Value 504 that provide an MED header 504a and extended power control information 504b. The MED header 504a includes an Organizationally Unique Identifier and a Power Control Subtype that may be defined consistently such that the PSE and PDs recognize the LLDP-MED PoE Dynamic Power Control TLV 500. In an embodiment, the Power Control Subtype may provide for different power control methods that may vary based on the power control environment. For example, a Power Control Subtype may provide a first power control method appropriate for a data center, a second power control method appropriate for an automobile, a third power control method appropriate for when an intermediate device is present between the PSE device 202 and a PD (discussed in further detail below), and/or other power control methods for a variety of other power control environments known in the art.

The extended power control information 504b may include variety of information that is detailed further in FIG. 5B. In the illustrated example, the extended power control information 504b includes sender information that details the originator of the LLDP-MED PoE Dynamic Power Control TLV 500 (e.g., a "0" for a PSE device and a "1" for a PD). The extended power control information 504b also includes power control event information that provides an event or control message (e.g., "0" for no event, "1" for a proposed maximum power level, "2" for a normal power state, "3" for a standby power state, "4" for a sleep power state, and "5" for removed power). The extended power control information 504b also includes a power priority (e.g., "0" for low priority, "1" for high priority, and "2" for mandatory priority). The extended power control information 504b also includes a maximum power value (e.g., 0-120 watts). The extended power control information 504b also includes a proposed power value (e.g., 0-120 watts).

Figure 6A:
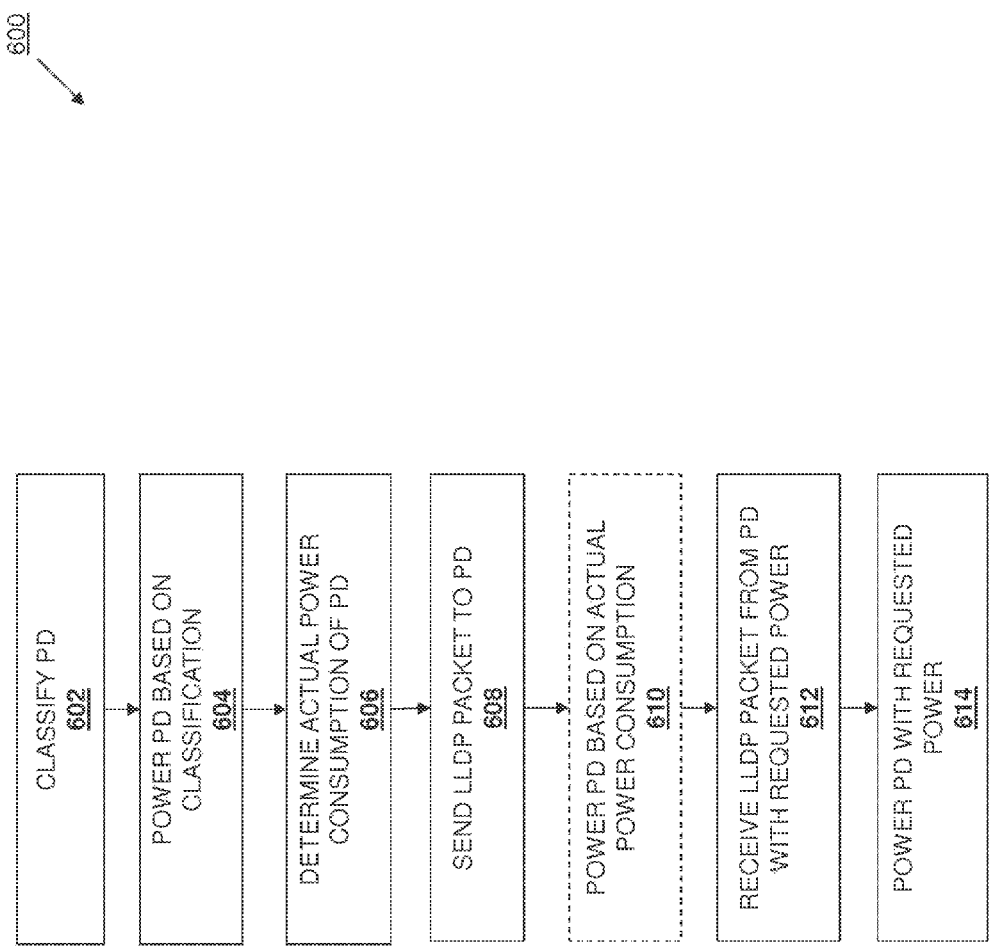
FIG. 6A is a flow chart illustrating an embodiment of a method for providing power.
Figure 6B:
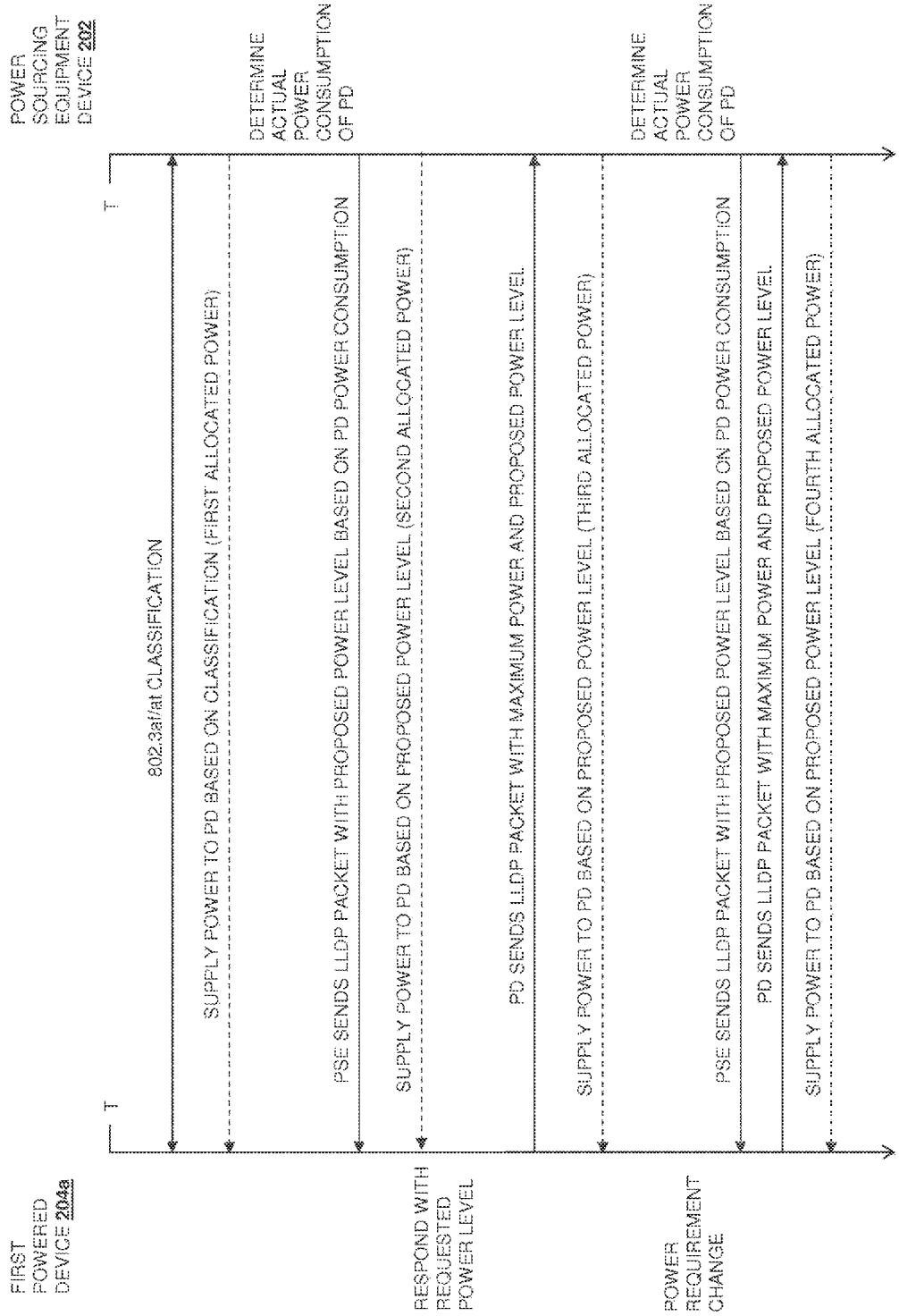
FIG. 6B is an interaction graph of a PSE device and a PE operating according to the method of FIG. 6A.

Referring now to FIGS. 2, 6A, and 6B, an embodiment of a method 600 for providing power is illustrated. The example of the method 600 discussed below references the PSE device 202 and the first PD 204a of FIG. 2 to illustrate the communications and power control between the PSE device 202 and the first PD 204a. However, the method 600 may be performed between any or all of the PDs 204a, 204b, and 204c and the PSE device 202 (and between multiple PDs and a PSE device) while remaining within the scope of the present disclosure. The method 600 begins at block 602 where the PD is classified. In an embodiment, the first PD 204a is connected to the PSE 202 using an Ethernet cable 206 connected to the PoE interface 208 on the PSE device 202 and the PoE interface 210 on the first PD 204a and, in response, the first PD 204a is classified by the PSE device 202 according to 802.3af or 802.3at standards. For example, the PSE device 202 may provide a pulse to measure a resistance in the first PD 204a that indicates which class (e.g., classes 0-4) the first PD 204a belongs to, and that class is used to determine what static power level should be allocated to the first PD 204a.

The method 600 then proceeds to block 604 where the PD is powered based on the classification. In an embodiment, the PSE device 202 is coupled to a power supply that provides the PSE device 202 a power budget that the PSE device 202 may allocate to one or more of the PDs 204a, 204b, and 204c. For example, the PSE device 202 may be operable to calculate the power budget from the \total power supplied to the PSE device 202 and available for the PDs 204a, 204b, and 204c. At block 604, the PSE device 202 supplies the static power level according to the classification performed in block 602, thus reducing the power budget available for other PDs. As illustrated in FIG. 6B, the supplying of power to the PD based on the classification provides a first allocated power to the PD. One of skill in the art will recognize blocks 602 and 604 of the method 600 as a prior art classification and PoE power provision. However, the systems and methods of the present disclosure provide for dynamic allocation of power to the PD based on its actual power consumption, power events in the PD, and increased powered demand by the PD, as detailed below.

The method 600 then proceeds to block 606 where the actual power consumption of the PD is determined. In an embodiment, at block 606, the PSE device 202 monitors the power consumption of the first PD 204a to determine an actual power consumption of the first PD 204a. For example, the PSE device 202 may monitor or otherwise determine the average power consumption of the first PD 204a, the maximum power consumption of the first PD 204a, and/or a variety of other power consumption details of the first PD 204a. As discussed above, the first PD 204a may be classified and then allocated power from the PSE device power budget based on that classification, which can result in more power being allocated to the first PD 204a than the first PD 204a is actually consuming (i.e., the first PD 204a may be consuming only a fraction of the power allocated by the PSE device 202 according to the classification.) Thus, at block 606, the PSE device 202 may determine that the first PD 204a is actually consuming a power amount that is less than the first allocated power/static power level provided to the first PD 204a based on the classification at block 602.

The method 600 then proceeds to block 608 where an LLDP packet is sent to the PD. In an embodiment, in response to determining that the actual power consumption of the first PD 204a is different from the power allocated to the first PD 204a in response to the classification at block 602, the PSE device 202 may send a LLDP-MED PoE Dynamic Power Control TLV 500 as part of an Ethernet frame 300 to the first PD 204a in order to propose a new power level that is based on the actual consumption of the first PD 204a. For example, the LLDP-MED PoE Dynamic Power Control TLV 500 sent in the Ethernet frame 300 by the PSE device 202 may include extended power control information 504b that includes that the PSE is the sender, a proposed maximum power level as the power control event, a power priority based on the power status of the PSE device 202 (e.g., low priority if the PSE device 202 has surplus power, a high power priority if the PSE 202 device is running out of surplus power, and a mandatory power priority if the PSE device is about to shut down due to lack of power), a maximum power value based on the classification of the first PD 204a, and a proposed power value based on the actual power consumption of the PD determined at block 606. The Ethernet frame 300 including the LLDP-MED PoE Dynamic Power Control TLV 500 is sent over the Ethernet cable 206 to the first PD 204a at block 608.

The method 600 may then proceed to optional block 610 where the PD is powered based on the actual power consumption determined in block 606. In an embodiment, optional block 610 may be performed following block 606 and before, concurrently with, or immediately after block 608. Thus, in some embodiments, the PSE device 202 may immediately begin powering the first PD 204a based on its actual power consumption determined in block 606, and the LLDP packet sent to the first PD 204a may be provided to inform the first PD 204a that its power allocation from the PSE device 202 has changed from that provided according to the classification at block 602. Thus, as illustrated in FIG.

6B, at optional block 610 the PSE device may provide a second allocated power to the first PD 204a that is based on the actual power consumption of the first PD 204a and that is less than the first allocated power provided in response to the classification of the first PD 204a. Furthermore, by sending the LLDP packet to the first PD 204a, the first PD 204a is put on notice of the new power allocation (and the limits of that new power allocation) from the PSE device 202, and in situations where optional block 610 is performed, must then negotiate increased power allocations (or further contribute to surplus power by requesting reduced power allocations) as discussed below. By powering the first PD 204a according to its actual power consumption, the excess, unused power previously allocated to the first PD 204a is returned to the power budget of the PSE device 202. In some embodiments, the PSE device 202 may recalculate the power budget at optional block 610.

The method 600 then proceeds to block 612 where an LLDP packet with a requested power is received from the PD. In an embodiment, the first PD 204a may send a LLDP-MED PoE Dynamic Power Control TLV 500 as part of an Ethernet frame 300 to the PSE device 202 in order to request a new power level allocation. In one embodiment, the PSE device 202 may be providing the first PD 204a power based on the actual power consumption of the first PD 204a determined in block 606 (and after providing the first PD 204a the LLDP packet informing the first PD 204a of the change in power level), and the first PD 204a may determine that it requires additional power. In another embodiment, the PSE device 202 may have provided the first PD 204a the LLDP packet indicating to the first PD 204a of a proposed change in power level allocation, and the first PD 204a may determine that it requires a different power level allocation than that proposed power level allocation.

For example, the LLDP-MED PoE Dynamic Power Control TLV 500 sent in the Ethernet frame 300 by the first PD 204a may include extended power control information 504b that includes that the first PD 204a is the sender, a power state (e.g., normal, standby, sleep, etc.) as the power control event, a power priority based on the power status of the first PD 204a (e.g., low priority if the first PD 204a will operate normally without the requested power, a high power priority if the first PD 204a is not operate normally without the requested power, and a mandatory power priority if the first PD 204a is about to shut down due to lack of power), a maximum power value that may include the maximum amount of power the first PD 204a will need, and a proposed power value that the first PD 204a is requesting. The Ethernet frame 300 including the LLDP-MED PoE Dynamic Power Control TLV 500 is sent over the Ethernet cable 206 and received by the PSE device 202 at block 612. In some embodiments, the first PD 204a may be limited to requesting only as much power as is permitted according to its 802.3af/at classification. In some embodiments, the first PD 204a may be required to reduce its power consumption to a proposed power level from the PSE device 202 when the power priority in the LLDP-MED PoE Dynamic Power Control TLV 500 is set to mandatory, and must comply with proposed power values in the LLDP-MED PoE Dynamic Power Control TLV 500 received from the PSE device 202.

The method 600 then proceeds to block 614 where the PD is powered with the requested power. As illustrated in FIG. 6B, at block 614, the PSE device may provide a third allocated power to the first PD 204a that is based on the requested power level/power level proposed by the first PD 204a. In an embodiment, power states of the first PD 204a may be defined in the PSE device 202 and associated with power level allocations, and the power state of the first PD 204a that is provided in the power control event in the extended power control information in the LLDP-MED PoE Dynamic Power Control TLV 500 sent in the Ethernet frame 300 may be used to retrieve the defined power states of the first PD 204a and look up their associated power requirements/power level allocations. Those associated power requirements may then be used to supply the appropriate amount of power to the PD at block 614.

As further illustrated in FIG. 6B, the power requirements of the first PD 204a may then change, and any or all of the steps described above may be repeated. For example, in the illustrated embodiment, the PSE device 202 may continue to determine the actual power consumption of the first PD 204a, sending an LLDP packet with a proposed power level along with supplying power to the PD at that proposed power level (a fourth allocated power level), and/or the PD may send an LLDP packet back with another proposed power level based on its new power requirements, all substantially as described above. In some embodiments, after any change in the power supplied to the first PD 204a, the PSE device 202 may recalculate the power budget.

Thus, a system and method have been described that provide for advanced PoE power control by a PSE device that continually monitors power consumption of a PD to determine the appropriate amount of power to allocate to that PD, along with providing continued negotiation between the PD and the PSE device to adjust the power allocation based on the current power states of the PSE device and the PD. The systems and methods of the present disclosure may be performed by a PSE with any number of PDs in order to efficiently allocate a power available to the PSE device to supply to the PDs. While the details of allocating power discussed above have been discussed based on the actual power consumption determined by the PSE device and changing power needs determined by the PD, the PSE device may be operable to allocate power to PDs based on PSE device port/interface profiles, priorities, events, device classifications, predetermined power states, predetermined power profiles, and/or a variety of other policies/configurations known in the art that may be set by a network administrator.

Figure 7:
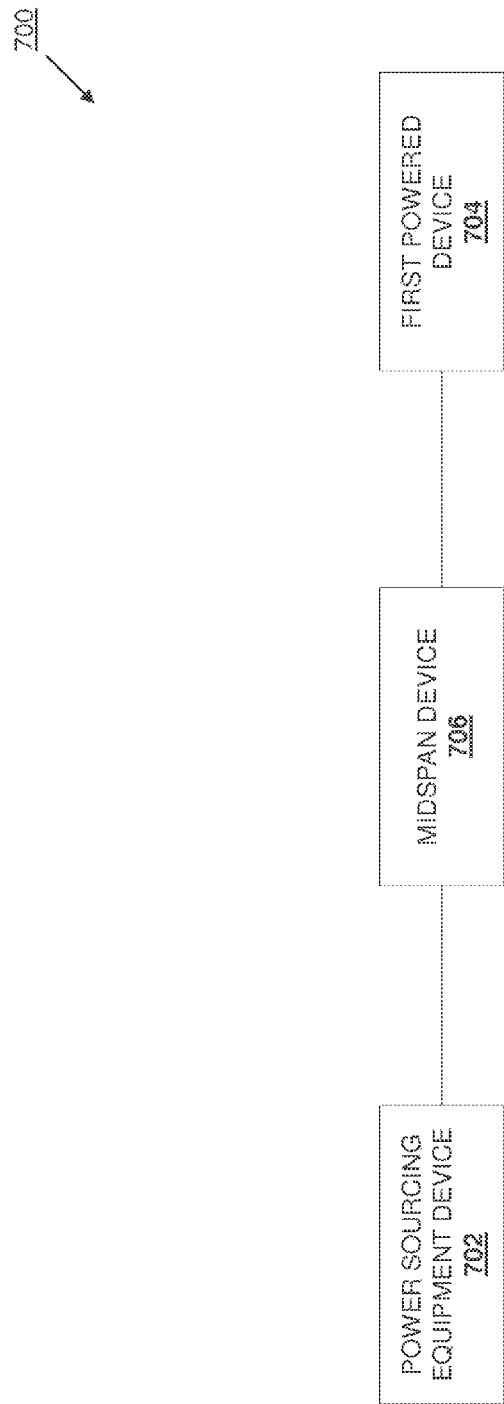
FIG. 7 is a schematic view illustrating an embodiment of a PoE system.

Referring now to FIG. 7, an embodiment of a PoE system 700 is illustrated that includes a PSE device 702 coupled to a first PD 704 through an intermediate PoE midspan device 706. In an embodiment, the operations to supply power from the PoE midspan device 706 to the first PD 704 occur substantially as discussed above according to the method 600, but with the provision that the PoE midspan device 706 is operable to convey the LLDP packets between the PSE device 702 and the first PD 704. In some embodiment, the PoE midspan device 706 may supply power to the first PD 704 while the PSE device 702 controls the power supplied to the first PD 704 by the PoE midspan device 706. In such an embodiment, the combined PSE device 702 and PoE midspan device 706 may operate substantially the same as the PSE device 202 discussed above, with the PoE midspan device 706 operable to determine the actual power consumption of the first PD 704 and provide that information to the PSE device 702, while conveying the LLDP packets between the PSE device 702 and the first PD 704.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A powering device, comprising:
   a combined data/power interface;
   a processing system coupled to the combined data/power interface; and
   a memory system coupled to the processing system and including instruction that, when executed by the processing system, cause the processing system to perform operations comprising:
      supply, through a combined data/power interface to a powered device, power at a first power level;
      receive, through the combined data/power interface from the powered device, requested power level information that is associated with a requested power level that is different from the first power level;
      send, through the combined data/power interlace to the powered device in response to receiving the requested power level information, proposed power level information that includes a second power level that is between the requested power level and the first power level; and
      supply, through the combined data/power interface to the powered device in response to receiving the requested power level information, power at the second power level.

2. The powering device of claim 1, wherein the operations further comprise:
   classify the powered device, wherein the first power level is supplied through the combined data/power interface to the powered device based on the classification of the powered device.

3. The powering device of claim 1, wherein the operations further comprise:
   determine an actual power consumption of the powered device;
   send, through the combined data/power interface to the powered device, proposed power level information that is based on the actual power consumption of the powered device; and
   supply, through the combined data/power interface to the powered device, power at the second power level that is associated with the proposed power level information.

4. The powering device of claim 1, wherein the operations further comprise:
   receive, through the combined data/power interface from the powered device, a power state of the powered device, wherein the power is supplied through the combined data/power interface to the powered device at the second power level based on the power state of the powered device.

5. The powering device of claim 1, wherein the operations further comprise:
   receive, through the combined data/power interface from the powered device, maximum power information for the powered device, wherein the power is supplied through the combined data/power interface to the powered device at the second power level based on the maximum power information for the powered device.

6. The powering device of claim 1, wherein the second power level is the requested power level.

7. A combined data/power provisioning system, comprising:
   a plurality of powered devices; and
   a powering device coupled to each of the plurality of powered devices, wherein the powering device is configured to:
      supply, to each of the plurality of powered devices, power at a respective initial power level;
      receive, from each of a subset of the plurality of powered devices, requested power level information that is associated with a requested power level for that powered device that is different from the respective initial power level provided to that powered device;
      send, to each of the subset of the plurality of powered devices from which the requested power level information was received, proposed power level information that includes a respective subsequent power level that is to be provided to that powered device and that is between the requested power level for that powered device and the initial power level provided to that powered device; and
      supply, to each of the subset of the plurality of powered devices from which the requested power level information was received, power at the respective subsequent power level that is different than the respective initial power level provided to that powered device.

8. The combined data/power provisioning system of claim 7, wherein the powering device is configured to:
   classify each of the plurality of powered devices, wherein the respective initial power level supplied to each of the plurality of powered devices is based on the classification of that powered device.

9. The combined data/power provisioning system of claim 7, wherein the powering device is configured to:
   determine an actual power consumption of at least one of the plurality of powered devices;
   send, to the at least one of the plurality of powered devices for which the actual power consumption was determined, proposed power level information that is based on the actual power consumption of that powered device; and
   supply, to the at least one of the plurality of powered devices that was sent proposed power information, power at the respective subsequent power level that is associated with the proposed power level information that was sent to that powered device.

10. The combined data/power provisioning system of claim 7, wherein the powering device is configured to:
    receive, from at least one of the plurality of powered devices, a power state of that powered device, wherein the power is supplied to the at least one of the plurality of powered devices from which the power state of that powered device was received at the respective subsequent power level based on the power state of that powered device.

11. The combined data/power provisioning system of claim 7, wherein the powering device is configured to:
    receive, from at least one of the plurality of powered devices, maximum power information for that powered device, wherein the power is supplied to the at least one of the plurality of powered devices from which maximum power information for that powered device was received at the respective subsequent power level based on the maximum power information for that powered device.

12. The combined data/power provisioning system of claim 7, wherein the respective subsequent power level provided to at least one of the plurality of powered devices is the requested power level for that powered device that is associated with the requested power level information that was received from that powered device.

13. A method for providing power, comprising:
  supplying, by a powering device to a powered device, power at a first power level;
  receiving, by the powering device from the powered device, requested power level information that is associated with a requested power level that is different from the first power level;
  sending, by the powering device to the powered device in response to receiving the requested power level information, proposed power level information that includes a second power level that is between the requested power level and the first power level; and
  supplying, by the powering device to the powered device in response to receiving the requested power level information, power at a second power level that is different than the first power level.

14. The method of claim 13, further comprising:
  classifying, by the powering device, the powered device, wherein the first power level is supplied by the powering device to the powered device based on the classification of the powered device.

15. The method of claim 13, further comprising:
  determining, by the powering device, an actual power consumption of the powered device;
  sending, by the powering device to the powered device, proposed power level information that is based on the actual power consumption of the powered device; and
  supplying, by the powering device to the powered device, power at the second power level that is associated with the proposed power level information.

16. The method of claim 13, further comprising:
  receiving, by the powering device from the powered device, a power state of the powered device, wherein the power is supplied by the powering device to the powered device at the second power level based on the power state of the powered device.

17. The method of claim 13, further comprising:
  receiving, by the powering device from the powered device, maximum power information for the powered device, wherein the power is supplied by the powering device to the powered device at the second power level based on the maximum power information for the powered device.

* * * * *

UNITED STATES PATENT AND TRADEMARK OFFICE
CERTIFICATE OF CORRECTION

Page 1 of 1

PATENT NO. : 9,678,563 B2
APPLICATION NO. : 15/251930
DATED : June 13, 2017
INVENTOR(S) : Rabah S. Hamdi and Bradley J. Booth It is certified that error appears in the above-identified patent and that said Letters Patent is hereby corrected as shown below:

In Column 9, Line 19: In Claim 1, please replace "interlace" with --interface--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*